United States Patent
Kim

(10) Patent No.: US 10,761,581 B2
(45) Date of Patent: Sep. 1, 2020

(54) METHOD AND MODULE FOR PROGRAMMABLE POWER MANAGEMENT, AND SYSTEM ON CHIP

(71) Applicant: SMARTECH WORLDWIDE LIMITED, Tortola (VG)

(72) Inventor: Jungug Kim, Richmond (CA)

(73) Assignee: SMARTECH WORLDWIDE LIMITED, Tortola (VG)

( * ) Notice: Subject to any disclaimer, the term of this patent is extended or adjusted under 35 U.S.C. 154(b) by 476 days.

(21) Appl. No.: 15/835,587

(22) Filed: Dec. 8, 2017

(65) Prior Publication Data

US 2019/0179394 A1   Jun. 13, 2019

(51) Int. Cl.

| G06F 1/3203 | (2019.01) |
|---|---|
| G06F 1/3206 | (2019.01) |
| G06F 1/3234 | (2019.01) |
| G06F 1/329 | (2019.01) |
| G06F 1/3296 | (2019.01) |
| G06F 1/324 | (2019.01) |

(52) U.S. Cl.
CPC .......... *G06F 1/3203* (2013.01); *G06F 1/3206* (2013.01); *G06F 1/329* (2013.01); *G06F 1/3234* (2013.01); *G06F 1/324* (2013.01); *G06F 1/3296* (2013.01)

(58) Field of Classification Search
CPC combination set(s) only.
See application file for complete search history.

(56) References Cited

U.S. PATENT DOCUMENTS

| 2008/0229130 A1* | 9/2008 | Guan | G06F 1/3203 713/323 |
|---|---|---|---|
| 2010/0205468 A1* | 8/2010 | Kim | G06F 1/3203 713/322 |
| 2013/0147526 A1* | 6/2013 | Kim | H03K 21/00 327/115 |

* cited by examiner

*Primary Examiner* — Terrell S Johnson
(74) *Attorney, Agent, or Firm* — IPro, PLLC

(57) ABSTRACT

A method and module for programmable power management and a system on chip are disclosed. The module includes: a token ring and an operation unit. The token ring is provided with a cyclically running token and forming a clock information. The operation unit is configured to perform a corresponding power management operation according to a predetermined operation step register and the token; wherein the step register records a time sequence for performing power management operations, the time sequence being represented by the clock information.

20 Claims, 3 Drawing Sheets

METHOD AND MODULE FOR PROGRAMMABLE POWER MANAGEMENT, AND SYSTEM ON CHIP

TECHNICAL FIELD

The present disclosure relates to the technical field of power management, and in particular, relates to a method and a module for programmable power management, and a system on chip.

BACKGROUND

Power consumption and power management are issues that have been highly concerned ever since. As transistor counts continue to increase, coupled with reducing feature size, system complexities have being increasing as well. In portable devices, Internet of Things and memories and the like application fields, reducing system power consumption is becoming more and more important.

The most commonly used technology to reduce power consumption is to dynamically control power voltages and clock signals in a system on chip (SoC). When the system has not work load, a module for power management in the system may turn off the power voltage and/or the clock, such that the system enters a dormant state in which power consumption is low. However, if an interval or external event occurs and the system thus needs to perform a corresponding task, the system in the dormant state is waken up and corresponding power voltages and clock signals are started.

As the reduction of power consumption is critical in mobile and memory applications, the system on chip generally has a plurality of complicated voltage domains, and control power and clocks in various voltage domains in different ways.

In the aspect of management of power and clocks, it is very complicated and difficult to control power and clocks in different voltage domains. In most application scenarios, requests to enter and exit (that is, wake-up) the dormant state are initiated frequently. Even if some voltage domains are taking a procedure to enter the dormant state, the system may receive a wake-up request, and needs to restart as soon as possible to enter an operating state.

Therefore, the module for power management for implementing the method for power managements may control clock-gating, resets, clock sources, resources, signal isolations, power source and the like important signals when the system is in the operating state.

Some typical module for power managements implemented based on hardware control all the signals related to the power source. Such a module for power management is capable of quickly entering or exiting the dormant state, and has a small leakage loss. However, the module for power management needs to be configured with great caution, since the module for power management controls very important signals, for example, the clock signal, reset signal and power source signal. If there is a bug in the module for power management, it causes a critical failure of whole chip.

For better fault tolerance of the module for power management and for ease of modification and update of the system, in the prior art a module for power management implemented based on a processor has been proposed. This module for power management may modify turn-on and turn-off control of the power source by updating a firmware program in the memory of a central processing unit, with no need to modify the hardware structure of the module for power management.

SUMMARY

An embodiment of the present disclosure provides a module for programmable power management. The module includes:
a token ring, provided with a cyclically running token and forming a clock information; and
an operation unit, configured to perform a corresponding power management operation according to a predetermined step register and the token; wherein the step register records a time sequence for performing power management operations, the time sequence being represented by the clock information Another embodiment of the present disclosure provides a method for programmable power management. The method includes:
predetermining several step register, each step register recording a time sequence for performing at least one power management operation;
configuring a token ring, the token ring comprising a cyclically running token and forming a clock information, the time sequence being represented by the clock information; and
performing a corresponding power management operation according to the token and the step register.

Still another embodiment of the present disclosure provides a chip for power management. The chip includes:
a token ring, provided with a cyclically running token and forming a clock information; and
an operation unit, configured to perform a corresponding power management operation according to a predetermined step register and the clock information;
wherein the step register records a time sequence for performing power management operations, the time sequence being represented by the clock information.

Still another embodiment of the present disclosure provides a system on chip, the system on chip includes:
a module for power management and configured to perform switching between a dormant state and an operating state of the system on chip;
the module including a token ring, provided with a cyclically running token and forming clock information; and
an operation unit, configured to perform a corresponding power management operation according to a predetermined step register and the token; wherein the step register records a time sequence for performing power management operations, the time sequence being represented by the clock information.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

Figure 1:
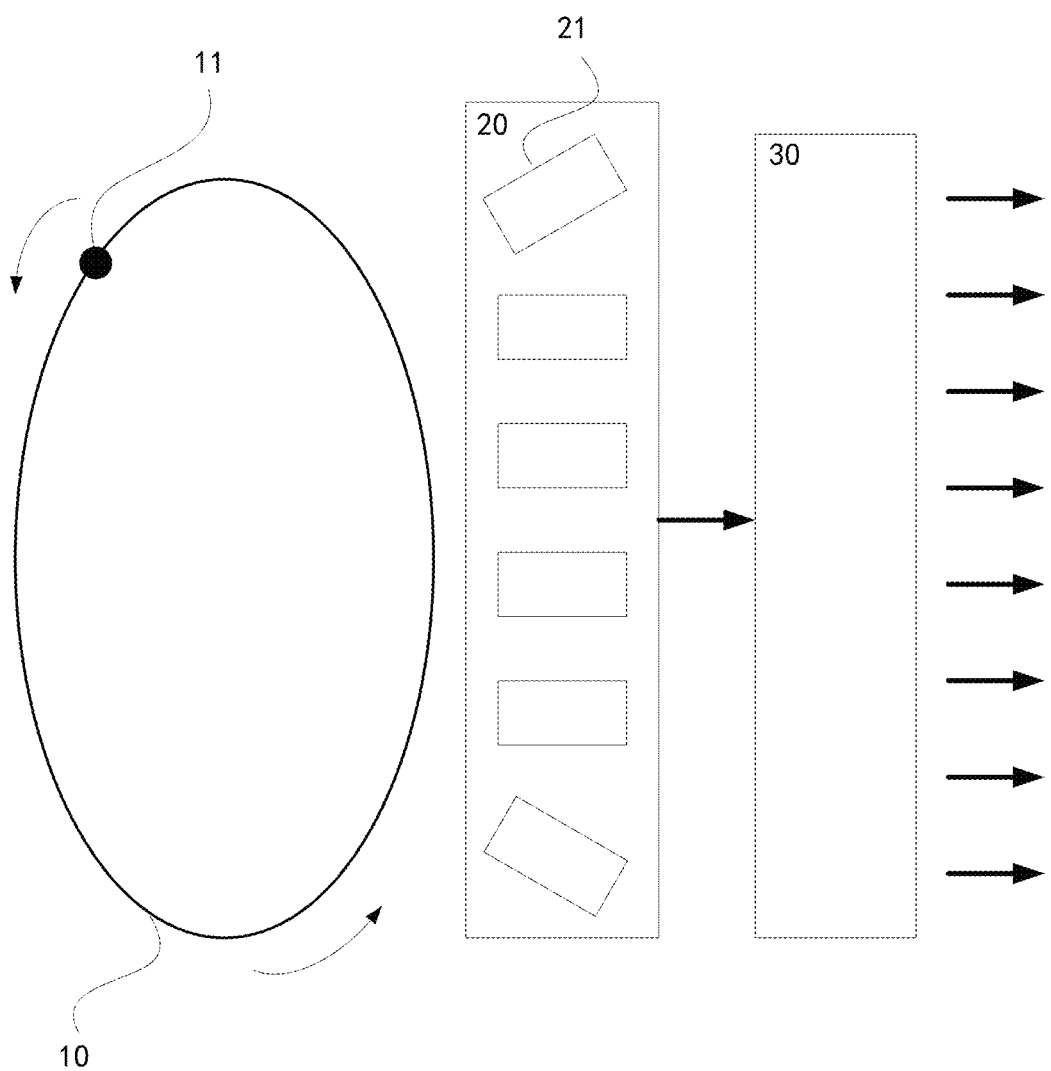
FIG. 1 is a schematic structural diagram of a module for power management according to an embodiment of the present disclosure.

In order to make the objectives, technical solutions, and advantages of the present disclosure clearer, the present disclosure is further described in detail below by reference to the embodiments and the accompanying drawings. It should be understood that the specific embodiments described herein are only intended to explain the present disclosure instead of limiting the present disclosure.

A system on chip (SoC) refers to a complete system formed by integrating a plurality of different electronic circuit function modules on a single chip. The system on chip may be used by an electronic device to control or implement one or a plurality of the functions. To accommodate different usage scenarios of the electronic device and reduce power consumption of the electronic device, a conventional chip on system (or chip system) generally at least has two states in which the power consumptions are different, for example, a dormant state with low power consumption and an operating state with normal power consumption, and switches to a corresponding state according to the usage scenario.

In this embodiment, the "operating state" indicates that the system on chip is normally operating, and is in the state with normal power consumption. In the operating state, the system on chip may operate in an operating clock rate, operating voltage and the like, to implement the corresponding functions. The "dormant state" indicates that the system on chip operates at a low clock frequency or voltage, and has low power consumption. Nevertheless, the system on chip may have more than two states in which power consumptions are different according to the complexity of the system, such that a complicated usage environment may be accommodated.

Generally, within a predetermined period of time, when the system on chip does not detect a request operation for an external event or an internal event, it may be considered that the electronic device is in a non-using stage in this case. Therefore, the system on chip may perform a series of operations (for example, turning off a power source voltage, reducing a clock frequency and the like), and switches from the operating state to the dormant state, thereby reducing power consumption of the system on chip. When detecting a request or a wake-up event, the system on chip may be quickly waken up and thus switches from the dormant state to the operating state. In this case, the power source voltage and the clock rate are restored to the normal values.

In the process in which the system on chip switches from the operating state to the dormant state, a plurality of power management operations related to power management need to be performed according to a predetermined time sequence (the specific power management operations are determined according to a voltage domain and the like situations on the system on chip).

In this embodiment, the power management operations are controlled and performed by a module for power management. In most cases, the power management operations to be performed by the module for power management needs to be modified according to actual needs. Therefore, it is desired and expected that the module for power management is well programmable. With the module for power management according to the embodiments of the present disclosure, the capabilities of performing power management operations of the module for power management may be conveniently adjusted while quick response and lowest leakage power consumption are ensured.

FIG. 1 is a schematic structural diagram of a module for power management according to an embodiment of the present disclosure. As illustrated in FIG. 1, the module for power management includes: a token ring 10 and an operation unit 30.

The token ring 10 is a closed ring. The token ring 10 is provided with a token 11 cyclically running with the time. The cyclically running token 11 is configured to provide corresponding clock information which is used as a reference system of a time sequence.

A plurality of step registers 21 form a step register library 20. Each step register 21 is data information that records and marks a time sequence for performing power management operations. To be specific, each step register 21 at least points to a power management operation, and records a time sequence for performing the power management operation and other power management operations.

In this embodiment, the "time sequence" is a value which represents the time for performing a specific power management operation during the process of switching to the dormant state, for example, the serial number of the power management operation that is performed. The time sequence recorded by the step register 21 is represented by the clock information of the token 11, and the token 11 is used as a reference system of the time sequence.

The operation unit 30 is configured to perform a corresponding power management operation according to a predetermined step register 21 and the token. Since the step register 21 discloses the clock information-represented time sequence that is provided by the token 11. Therefore, the operation unit 30 may choose a step register 21 to be performed from the step register library 20 according the running token and perform the corresponding power management operation In this embodiment, the token ring 10 is practiced by hardware design (for example, a timer or the like), and constantly and cyclically runs in the module for power management, which is not subject to interference and impact. The operation unit 30 is a hardware execution part in the module for power management, and is configured to determine a power management operation to be currently performed, and perform the power management operation, to implement state switching of the system on chip. The step register 21 is a firmware program pre-programmed in a central controller of the system on chip.

In this embodiment, a "dormancy request" represents a program instruction for entering the dormant state that is received by the system on chip. A "wake-up request" represents a program instruction for entering the operating state that is received by the system on chip. The "dormancy request" and the "wake-up request" may be both trigger due to a plurality of causes, and have a program instruction in any suitable form.

In practice, when a dormancy request is received, the token 11 may be started and cyclically runs in the token ring 10. The module for power management selects a corresponding step register 21 from the step register library 20 according to the clock information of the token 11 at the current time.

Afterwards, the selected step register 21 may be input to the operation unit 30, and the operation unit 30 performs the power management operation corresponding to the selected step register 21. Finally, the module for power management needs to repeatedly perform the above two steps, until all the power management operations are performed by the operation unit 30, such that the system on chip switches from the operating state to the dormant state.

In the module for power management according to the embodiments of the present disclosure, an independent closed-loop running token is configured, and a corresponding standard time reference system is provided, such that the power management operation to be performed by the module for power management is decoupled and separated from the time sequence. In this way, modification of the time sequence may be conveniently practiced by modifying the firmware program on the system on chip. The entire module for power management does not require an additional memory which stores data related to the performing of the power management operations. In this way, the leakage power consumption is lower and the layout area occupied is reduced.

In this embodiment, the process in which the operation unit successfully performs a power management operation may be referred to as an execution cycle. As described above, the system may experiences a lot of different execution cycles in the process of switching from the operating state to the dormant state.

Generally, the wake-up request of the system on chip is frequently generated, and a corresponding wake-up event may also be received in the execution cycle. Therefore, for a quick response to the wake-up request, the system quickly enters the operating state. In some embodiments, the module for power management may also configure a detection node in the execution cycle.

The detection node is a time point that is predetermined in the execution cycle for detect the wake-up event. After the detection node is configured, in the execution cycle, each time when the detection node is reached, the module for power management may detect whether a wake-up event is present. If a wake-up event is present, the module for power management may quickly exit the current execution cycle, such that the system re-enters the operating state. If no wake-up event is detected, the module for power management continues running in the execution cycle.

In this way, the module for power management may quickly exit the execution cycle, make a response to the wake-up request and switches to the operating state, with no need to making a response to the wake-up request after all the power management operations are performed. This effectively shortens the response time of the wake-up request.

In some embodiments, the token ring 10 is divided into a plurality of time slots. Each time slot has a different value. For example, the token ring 10 may be divided into 10 time slots, and the 10 time slots are respectively represented by values 0 to 9. As such, the token 11 running in the token ring 10 has cyclically varied values 0 to 9.

Correspondingly, the step register library 20 may have 10 step registers. Each step register 21 may determine the time sequence for performing the power management operations by recording the corresponding power management operations and their unique values. For example, one step register 21 records the value of the power management operation for clock-gating control as 2, and another step register 21 records the value of the power management for isolation as 3, and still another step register 21 records the value of the power management operation for resetting as 1. This indicates that these three power management operations are performed in a time sequence of: resetting, clock-gating control and isolation.

In this embodiment, the time sequence and the clock information are both represented by the value. The module for power management may conveniently determine a power management operation to be currently performed according to the value of the token. The operation unit 30 may go through the values recorded by the step registers 21. If a value recorded by a step register 21 is equal to the current value of the token 11, the corresponding step register 21 is enabled to acquire the token 11, and perform the power management operation corresponding to the step register 21.

In this embodiment, the token 11 is configured to provide an execution or operation right. After the step register 21 acquires the token 11, the step register 21 acquires the execution or operation right and enables the operation unit 30 to perform the corresponding power management operation.

In some other embodiments, only one token cyclically runs in the token ring. Therefore, after the module for power management experiences one execution cycle, the token acquired by the step register needs to be released again, such that the token runs again continuously and cyclically in a closed loop and is to be acquired by another step register. In this way, the power management enters a next execution cycle.

It may be understood that in the module for power management according to this embodiment, the step register 21 functions as an index to guide the operation unit 30 to perform the power management operations according to a specific time sequence. When the time sequence for performing the power management operations needs to be adjusted, a person skilled in the art may update the values record by the related step registers by means of updating the firmware program on the system on chip, and modify the recorded values or the corresponding relationship between the values and the power management operations.

In some embodiments, as illustrated in FIG. 1, the operation unit 30 specifically includes a logic matrix formed by a plurality of control logics. The logic matrix is practiced by using a pre-designed hardware circuit. The logic matrix outputs corresponding control logics to different function modules according to the step registers that acquire the token, to perform the power management operations.

In the module for power management according to the embodiments of the present disclosure, the token in the token ring 10 and the logic matrix 30 are both practiced by means of a hardware circuit. A mapping relationship is established therebetween via the step register, such that the module for power management is capable of performing the power management operations according to the time sequence, and the system on chip switches from the operating state to the dormant state.

In the entire module for power management, no additional memory needs to be added, and thus the problems of leakage loss and large occupied layout area are solved. In addition, by means of the hardware circuit, a high execution speed is achieved.

Figure 2:
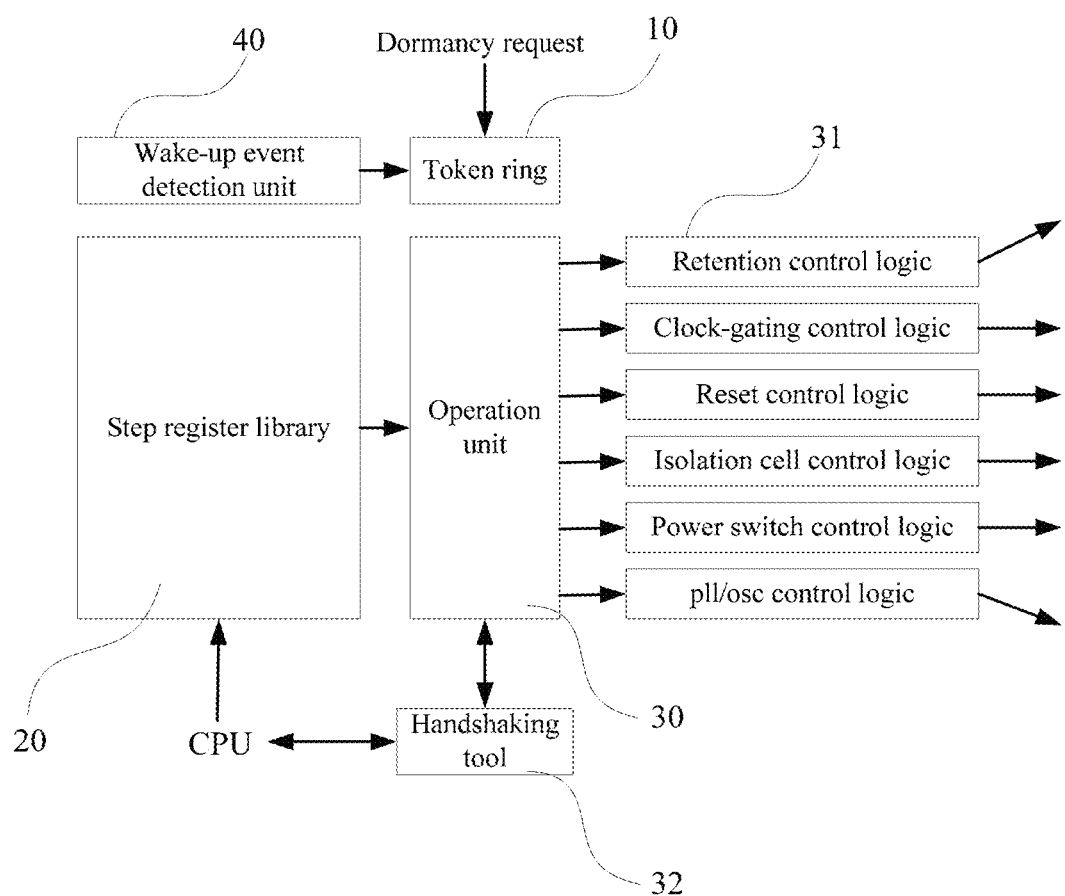
FIG. 2 is a functional block diagram of application of the module for power management on a system on chip according to an embodiment of the present disclosure.

FIG. 2 is a functional block diagram of a module for power management according to an embodiment of the present disclosure. The module for power management is applied in a system on chip, and is configured to control switching between the operating state and the dormant state of the system on chip.

In this embodiment, the system on chip has at least one central processing unit (CPU) which performs logic operations and control coordinated running of the system. The switching between the operating state and the dormant state of the system on chip is implemented by the sequentially performed power management operations (for example, a register value retention operation, a clock-gating control operation, a reset operation, an isolate operation, a power switch operation and a phase-locked loop control operation).

According to a feedback of practical running, after the module for power management receives a dormancy request, the token 11 starts running in the token ring 10 in a closed-loop manner. The step register 21 in the step register library 20 is from the firmware program of the CPU, and is defined by the firmware program. Upon acquiring the token, the logic matrix 30 acquires an authorized step register acquired the token, and outputs a corresponding control logic 31 to a corresponding function module of the system on chip to perform a corresponding power management operation.

For example, a register value retention control logic is sent to an SRAM and a trigger, a clock-gating control logic is sent to a clock-gating control module, a reset control logic is sent to a resetting module, an isolation cell control logic is sent to an isolation cell setting module, a power switch control logic is sent to a power switch or a power source, and a crystal oscillator/phase-locked loop control logic is sent to a crystal oscillator and a phase-locked loop.

The logic matrix 30 may establish a control relationship with a CPU via a handshaking tool 32, and controls the CPU to enter the dormant state via the handshaking tool 32 after the CPU makes the corresponding preparations.

A wake-up event detection unit 40 is connected to the token running in a closed-loop manner, and detects whether a wake-up event is present in each execution cycle of the module for power management. If a wake-up event is present, the module for power management exits the execution cycle, such that the system on chip re-enters the operating state and makes a timely response to the wake-up request.

The system on chip which employs the module for power management according to the embodiments of the present disclosure is flexible, and may modify the module for power management by updating the firmware program. The fault or bug of the module for power management in the design process does not cause critical failure of the system on chip, and may be rectified by updating the firmware program of the CPU of the system on chip (that is, modifying the step register 21).

In addition, the module for power management is practiced by using a hardware circuit, and thus has a quick operation processing speed, with no need to additionally configuring a memory. In this way, the problems of leakage loss and larger occupied layout area are solved. This is favorable to reducing the manufacturing cost of the system on chip and power consumption thereof, and improves low-power consumption performance of the system on chip.

A person skilled in the art should be aware that the hardware circuit of the power management module according to an embodiment of the present disclosure can be packaged in a chip to be a individual chip.

An embodiment of the present disclosure further provides a power management chip contains the hardware circuit of the power management module. In system-in-package, the power management chip as a function module, which is configured to cooperate with the other module of the system, is packaged in a system on chip.

Figure 3:
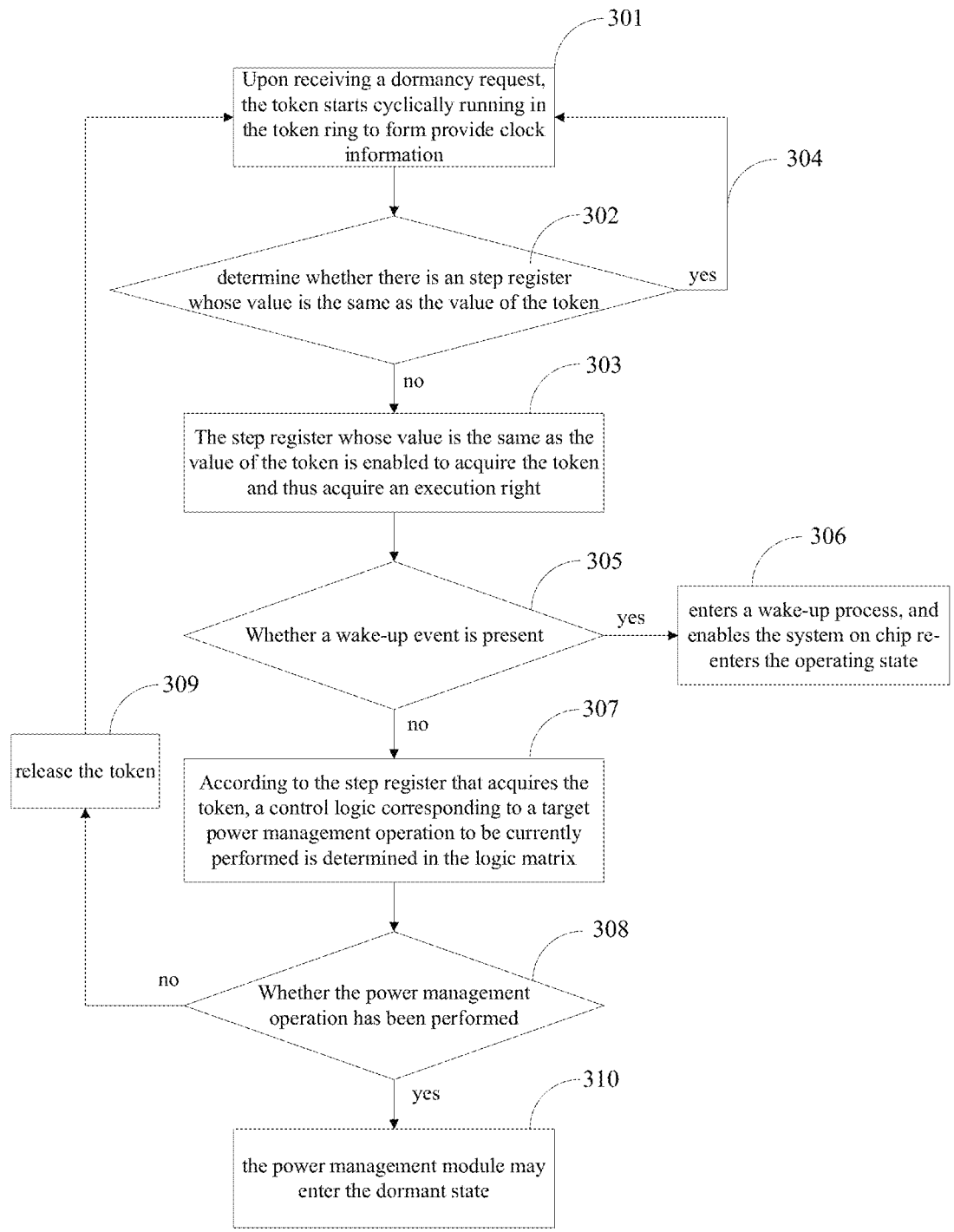
FIG. 3 is a flowchart of a method for power management according to an embodiment of the present disclosure.

The specific running process of the module for power management is described in detail hereinafter with reference to the module for power management as illustrated in FIG. 2. FIG. 3 is a flowchart of an operating process of a method for power management according to an embodiment of the present disclosure.

As illustrated in FIG. 3, the operating process may specifically include the following steps:

301: Upon receiving a dormancy request, the token starts cyclically running in the token ring to provide clock information.

As described in the above embodiments, the cyclically running token may function as clock, and provide clock information for reference, to ensure that the module for power management may perform power management operations according to a predetermined time sequence.

302: A step register library is traversed to determine whether there is a step register whose value is the same as the value of the token. If there is a step register whose value is the same as the value of the token, step 303 is performed; and otherwise, step 304 is performed.

In this embodiment, the value is predefined. The value may be specifically set according to actual needs, for example, the precision requirement, the number of step registers and the like. The time slots are arranged in sequence, for example, time slots arranged from time slot 0 to time slot 9.

The step register is data information predefined. Each step register includes a time sequence for performing at least one power management operation. Specifically, the step register defines the time sequence for performing power management operations by recording the values and the corresponding power management operations.

For example, a smaller value may be set for a power management operation that needs to be performed preferentially, and a larger value may be set for a power management operation that is to be performed subsequently.

303: The step register whose value is the same as the value of the token is enabled to acquire the token and thus acquire an execution right.

In this embodiment, the matching relationship between the tokens and the step registers is determined according to the values. In some other embodiments, the corresponding relationship between the tokens and the step registers may also be determined according to any other suitable parameter including time sequence information. The token provides a right for performing an operation. If the step register acquires the token, the power management operation corresponding to the step register may be performed.

304: The process returns to step 301, such that the token continues cyclically running.

At some time points, the value of the token may not be the same as the value of any step register. In this case, the token may not be acquired but continues cyclically running in the token ring. At a next time slot, whether there is a step register whose value is the same as the time slot of the token may be further determined.

305: Whether a wake-up event is present. If a wake-up event is present, step 306 is performed; and otherwise, step 307 is performed. The wake-up event refers to a wake-up request for the system on chip to enter the operating state. The wake-up event may be specifically an event or operation of any suitable type, for example, a tap operation abruptly input by a user or an input instruction.

306: The module for power management exits the current execution cycle, enters a wake-up process, and enables the system on chip re-enters the operating state.

In this embodiment, the wake-up process specifically refers to a series of operations or steps to be performed by the system on chip which enters the operating state. The wake-up process is determined according to actual needs of the system on chip, and different systems on chip generally have different wake-up processes. This is a common technical means in the art, which is not described herein any further.

If a wake-up event is present in the system on chip, to provide better user experience or better usage performance, it is always expected that a response is made in a shortest time to the wake-up event (or wake-up request), such that the system quickly enter the operating state.

In this embodiment, through the additional steps 305 to 306, it may be ensured that the module for power management makes a response to the wake-up event within each execution cycle, such that the system on chip has a very high response speed.

307: According to the step register that acquires the token, a control logic corresponding to a target power management operation to be currently performed is determined in the logic matrix.

In this embodiment, the step register is configured to establish a correlation between the token ring and the logic matrix. Different step registers record corresponding power management operations and a time sequence (represented by values) for performing the power management operations.

Therefore, after a specific step register is input to the logic matrix, the logic matrix may uniquely determine a control logic to be output according to the step register (for example, parameter control for the phase-locked loop). The control logic refers to an operation process corresponding to the power management operation to be performed (for example, turn-on or turn-off of some switches, ratio adjustment of some clock frequencies and the like). The control logic may be practiced by using a predetermined hardware circuit.

308: Whether the power management operation is successfully performed is determined. If the power management operation is successfully performed, step 309 is performed; and otherwise, the power management operation is continuously performed.

309: The token is released from the step register, and the process returns to step 301, such that the token cyclically runs again. After step 309 is performed successfully, a complete execution cycle is terminated, and the module for power management enters a next execution cycle.

As described above, the module for power management completes a work task after sequentially performing all the power management operations. Therefore, each time the token is released, the module for power management further needs to determine whether there is a step register that is not performed.

If there is still a step register that is not performed, the process returns to step 301, and the module for power management continuously enters a next execution cycle. If there is no step register that is not performed, it indicates that the power management operation for the module for power management to switch to the dormant state is successfully performed, and the module for power management may enter the dormant state (step 310), and waits for a next task.

It should be noted that the method embodiments and the apparatus embodiments are based on the same inventive concept. Therefore, the corresponding content in the apparatus embodiments likewise applies to the method embodiments, which is not described herein any further.

A person skilled in the art should be further aware that with reference to the embodiments of the present disclosure disclosed herein, various exemplary method for programmable power managements may be implemented in the form of electronic hardware, computer software or a combination thereof. To clearly describe interchangeability between the hardware and software, the above description has generally illustrated the compositions and steps of the various examples according to the functions. Whether such functions are implemented in the form of software or hardware depends on the specific application and the design restrictions applied to the entire system.

A person skilled in the art may implement the described functions by using different methods for each specific application. However, such implementation shall not be deemed as going beyond the scope of the present disclosure. The computer software program may be stored in a computer readable storage medium, wherein the computer software program, when being executed, may perform the steps and processes according to the above method embodiments. The storage medium may be any medium capable of storing program codes, such as read-only memory (ROM), a random access memory (RAM), a magnetic disk, or a compact disc-read only memory (CD-ROM).

Described above are exemplary embodiments of the present disclosure, but are not intended to limit the scope of the present disclosure. Any equivalent structure or equivalent process variation made based on the specification and drawings of the present disclosure, which is directly or indirectly applied in other related technical fields, fall within the scope of the present disclosure.

What is claimed is:

1. A module for programmable power management, comprising:
   a token ring, provided with a cyclically running token and forming a clock information; and
   an operation unit, configured to perform a corresponding power management operation according to a predetermined step register and the clock information;
   wherein the step register records a time sequence for performing power management operations, the time sequence being represented by the clock information.

2. The module according to claim 1, further comprising:
   a wake-up event detection unit, configured to detect whether a wake-up event is present before the operation unit performs the power management operation.

3. The module according to claim 1, wherein the token ring comprises a plurality of time slots having different values, and the clock information is represented by the value of the time slot; and
   when the value of the token is the same as a value recorded by the step register, the operation unit is configured to enable the step register to acquire the token, and perform the power management operation corresponding to the step register.

4. The module according to claim 3, wherein after the operation unit performs the power management operation corresponding to the step register, the step register is configured to release the token, and cyclically run again on the token ring.

5. The module according to claim 3, wherein the operation unit comprises a logic matrix formed by a plurality of control logics, and each control logic corresponds to one power management operation; and
   the operation unit is configured to determine a target power management operation to be performed according to the predetermined step register and the clock information, and output a control logic corresponding to the target power management operation to a corresponding function unit.

6. A method for programmable power management, comprising:

predetermining several step registers, each step register recording a time sequence for performing at least one power management operation;

configuring a token ring, the token ring comprising a cyclically running token and forming a clock information, the time sequence being represented by the clock information; and performing a corresponding power management operation according to the token and the step register.

7. The method according to claim 6, wherein prior to the performing a corresponding power management operation, the method further comprises:

detecting whether there is a wake-up event at a predetermined detection node; and stopping running the token and performing a wake-up process if there is a wake-up event.

8. The method according to claim 6, wherein the token ring comprises a plurality of time slots having different values, and the clock information is represented by the value of the time slot; and the performing a corresponding power management operation according to the token and the step register comprises:

achieving a current value of the token;

determining whether there is a step register whose value is the same as the value of the token;

enabling the step register whose value is the same as the value of the token to acquire the token, and performing the power management operation corresponding to the step register; and continuing running the token if there is not a step register recording value is the same as the value of the token.

9. The method according to claim 8, wherein after the performing the power management operation corresponding to the step register, the method further comprises:

enabling the step register to release the token, and cyclically running the token in the token ring again.

10. The method according to claim 8, wherein the performing a corresponding power management operation comprises:

determining, according to the predetermined step register and the token, a target power management operation to be performed; and outputting a control logic corresponding to the target power management operation to a corresponding function unit from a logic matrix; wherein the logic matrix comprises a plurality of predetermined control logics, each control logic corresponding to one power management operation.

11. A chip for power management, comprising a token ring, provided with a cyclically running token and forming a clock information; and an operation unit, configured to perform a corresponding power management operation according to a predetermined step register and the clock information;

wherein the step register records a time sequence for performing power management operations, the time sequence being represented by the clock information.

12. The chip according to claim 11, further comprising:

a wake-up event detection unit, configured to detect whether a wake-up event is present before the operation unit performs the power management operation.

13. The chip according to claim 11, wherein the token ring comprises a plurality of time slots having different values, and the clock information is represented by the value of the time slot; and when the value of the token is the same as a value recorded by the step register, the operation unit is configured to enable the step register to acquire the token, and perform the power management operation corresponding to the step register.

14. The chip according to claim 13, wherein after the operation unit performs the power management operation corresponding to the step register, the step register is configured to release the token, and cyclically run again on the token ring.

15. The chip according to claim 13, wherein the operation unit comprises a logic matrix formed by a plurality of control logics, and each control logic corresponds to one power management operation; and the operation unit is configured to determine a target power management operation to be performed according to the predetermined step register and the clock information, and output a control logic corresponding to the target power management operation to a corresponding function unit.

16. A system on chip, comprising a module for power management configured to perform switching between a dormant state and an operating state of the system on chip;

the module comprising a token ring, provided with a cyclically running token and forming a clock information; and an operation unit, configured to perform a corresponding power management operation according to a predetermined step register and the token;

wherein the step register records a time sequence for performing power management operations, the time sequence being represented by the clock information.

17. The system on chip according to claim 16, the module further comprising a wake-up event detection unit, configured to detect whether a wake-up event is present before the operation unit performs the power management operation.

18. The system on chip according to claim 16, wherein the token ring comprises a plurality of time slots having different values, and the clock information is represented by the value of the time slot; and when the time slot value of the token is the same as a value recorded by the step register, the operation unit is configured to enable the step register to acquire the token, and perform the power management operation corresponding to the step register.

19. The system on chip according to claim 18, wherein after the operation unit performs the power management operation corresponding to the step register, the step register is configured to release the token, and cyclically run again on the token ring.

20. The system on chip according to claim 18, wherein the operation unit comprises a logic matrix formed by a plurality of control logics, and each control logic corresponds to one power management operation; and the operation unit is configured to determine a target power management operation to be performed according to the predetermined step register and the clock information, and output a control logic corresponding to the target power management operation to a corresponding function unit.

* * * * *